United States Patent [19]
Torsti

[11] Patent Number: 5,724,397
[45] Date of Patent: Mar. 3, 1998

[54] METHOD FOR SYNCHRONIZING A RECEIVER

[75] Inventor: Simo-Pekka Torsti, Espoo, Finland

[73] Assignee: Nokia Telecommunications Oy, Espoo, Finland

[21] Appl. No.: 693,132

[22] PCT Filed: Feb. 14, 1995

[86] PCT No.: PCT/FI95/00067

§ 371 Date: Aug. 13, 1996

§ 102(e) Date: Aug. 13, 1996

[87] PCT Pub. No.: WO95/22861

PCT Pub. Date: Aug. 24, 1995

[30] Foreign Application Priority Data

Feb. 15, 1994 [FI] Finland ............... 940706

[51] Int. Cl.[6] ............... H04B 1/38; H04L 7/00; H04L 27/06; H04L 25/40

[52] U.S. Cl. ............... 375/355; 375/222; 375/344; 375/371

[58] Field of Search ............... 375/355, 371, 375/344, 316, 317, 373, 222; 327/141; 371/47.1

[56] References Cited

U.S. PATENT DOCUMENTS

| 4,344,176 | 8/1982 | Qureshi. | |
|---|---|---|---|
| 4,805,191 | 2/1989 | Burch et al.. | |
| 5,317,600 | 5/1994 | Känsäkoski | 375/344 |

FOREIGN PATENT DOCUMENTS

| 578 489 | 1/1994 | European Pat. Off.. |
|---|---|---|
| 93/01667 | 1/1993 | WIPO. |

*Primary Examiner*—Stephen Chin
*Assistant Examiner*—Betsy L. Deppe
*Attorney, Agent, or Firm*—Cushman Darby & Cushman Intellectual Property Group of Pillsbury Madison & Sutro LLP

[57] ABSTRACT

A method for synchronizing a receiver with the frequency and phase of a received signal, including the steps of taking a sample of the received signal at predetermined intervals and selecting a decision sample from the samples taken. To produce accurate and reliable synchronization, at least two samples are taken during the duration of one received symbol; a first reference sample is selected from the samples preceding the decision sample; a second reference sample is selected from the samples subsequent to the decision sample; the difference of the first and the second reference samples is calculated; the difference is compared with the target value; and the sampling frequency is adjusted on the basis of the comparison.

6 Claims, 2 Drawing Sheets

METHOD FOR SYNCHRONIZING A RECEIVER

This application claim benefit of international application PCT/FI95/00067, filed Feb. 14, 1995.

BACKGROUND OF THE INVENTION

The present invention relates to a method for synchronizing a receiver with the frequency and phase of a received signal, this method comprising the steps of taking a sample of the received signal at predetermined intervals, at least two samples being taken during the duration of one received symbol; selecting a decision sample from the samples taken; selecting a first reference sample from the samples preceding the decision sample; and selecting a second reference sample from the samples subsequent to the decision sample.

The invention particularly relates to receivers operating in connection with a baseband PAM (Pulse Amplitude Modulation) line code, and it is particularly advantageous in connection with synchronizing a four-wire baseband modem in a multipoint network.

The invention relates to establishing and maintaining a connection between a transmitter and a receiver, for instance between two baseband modems, it being thus necessary to adjust the sampling frequency of the receiver in accordance with the symbols transmitted by the transmitter so that the receiver will be able to make correct decisions on the symbols transmitted by the transmitter. In the initial situation, the transmitter transmits symbols at its own frequency, and the receiver takes samples of the signal applied to it at its own sampling frequency, which is with a certain accuracy (e.g. 200 ppm) the same as the multiple of the symbol frequency used by the transmitter. The clock of the transmitter may vary (jitter) within certain limits in comparison with the basic clock of the receiver. The purpose of the synchronization of the receiver is to make the symbol clock of the receiver follow as accurately as possible the symbol clock of the transmitter. This is carried out by extending or reducing the clock cycles of the symbol clock of the receiver. The phase of the symbol clock of the receiver is at its optimum in relation to the symbol clock of the transmitter when the receiver makes decisions regarding the transmitted symbols on the basis of that point of the pulse response which is the global maximum of the absolute value of the pulse response.

A decision-using method is previously known for synchronizing the sampling frequency of a receiver with the frequency of a received signal, in which method the receiver takes samples of the signal applied to it at a symbol frequency. In this method, the ratio of the first maximum of the absolute value of the pulse response to the value preceding it by the duration of one symbol is used as synchronization information. In practice, this is obtained, for instance, as a ratio of the received symbol to the error of the previous symbol (an error refers in this context to the difference between the output of the equalizer and the decision made by the detector).

In the above-mentioned known method, the symbol clock of the receiver is adjusted in such a manner that the ratio remains as a predetermined constant on the average. If the calculated value deviates from the reference value in the same direction sufficiently often, the sampling frequency used by the receiver is adjusted for instance by decelerating or accelerating the clock of the receiver.

This previously known synchronization method works well when the phase of the symbol clock is correct at the outset, or nearly correct. If the phase deviates greatly from the target in the initial situation, for instance at the beginning of a situation where a new connection is established, it may occur at the synchronization stage that all symbols cannot be received without errors, even if the equalizers are adjusted in accordance with the new channel and the given sampling moment.

SUMMARY OF THE INVENTION

The object of the present invention is to solve the above-mentioned problem and provide a method by means of which the receiver can seize the symbol sync of the transmitter and move the phase of the receiver towards the optimum in such a manner that all symbols can be received without errors occurring after the equalizers have been adjusted, despite the phase difference of the symbol clocks of the transmitter and the receiver in the initial situation. This object is achieved with the method of the invention, characterized in calculating the difference of the first and second reference samples, comparing the difference with the target value, and adjusting the sampling frequency on the basis of the comparison.

The invention is based on the idea that the samples taken between the samples used for decision-making are used for inferring synchronization information. If two samples are taken of one symbol, every other sample is used for synchronization and every other sample is used for decision-making. If N samples are taken of the transmitted symbol, also other samples than those which are taken at a moment half a symbol away from the moment of decision-making can be used for synchronization. The most significant advantage of the method of the invention is that synchronization can be produced in a more reliable manner than by the previously known methods, without losing symbols at the synchronization stage irrespective of what the initial phase difference of the symbol clocks of the transmitter and the receiver is.

BRIEF DESCRIPTION OF THE CLAIMS

In the following, the invention will be described in more detail by means of the first preferred embodiment of the method of the invention with reference to the accompanying figures, in which:

FIGS. 1–4 show the estimate of the pulse response of the channel in connection with one transmitted symbol, FIG. 5 shows a signal seen by the receiver in connection with several transmitted symbols, and FIG. 6 shows a block diagram of the receiver of a baseband modem.

DETAILED DESCRIPTION

Figure 1:
Figure 2:
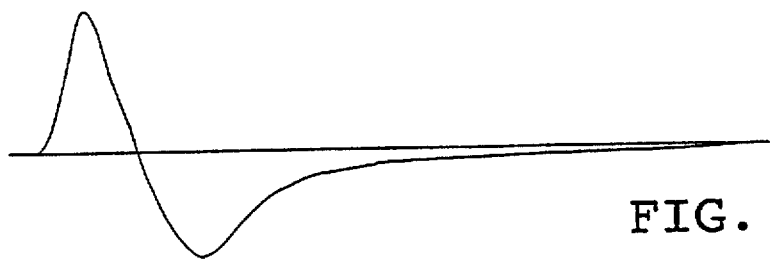
Figure 3:
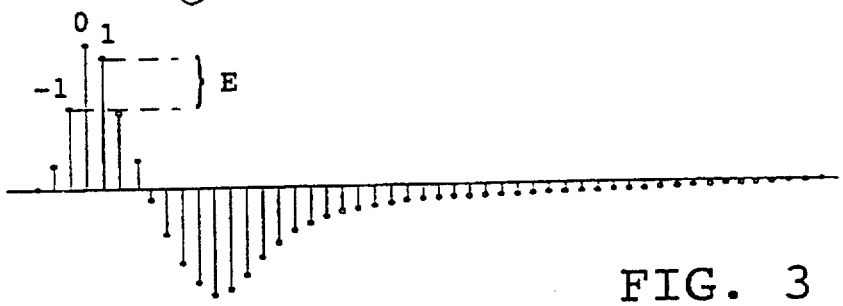

FIGS. 1–4 show an example of the estimate of the pulse response of the channel in connection with one transmitted symbol. The horizontal axes in FIGS. 1–4 represent time, and the vertical axes represent signal amplitude. The curve in FIG. 1 represents the shape of the pulse transmitted by the transmitter. The curve in FIG. 2 represents the pulse shape seen by the receiver, and the curve in FIG. 3 represents the estimate of the pulse response of the receiver as sampled with the random phase of the receiver clock twice in a symbol. FIG. 3 shows a sample 0 selected for decision-making, this sample being the first local maximum of the absolute value of the pulse response. In the case of FIG. 3, a sample −1 preceding the decision sample 0 is then selected as a first reference sample, and a sample 1 subsequent to the decision sample 0 is selected as a second reference sample. FIG. 3 illustrates a difference E of the reference samples in the initial situation.

Figure 4:
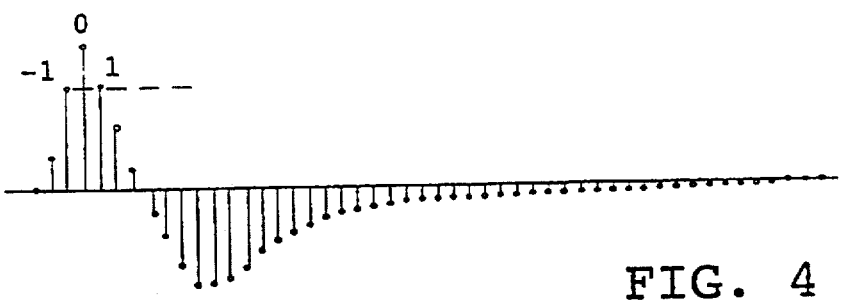

In the case of FIG. 4, the pulse response is sampled twice in a symbol when the synchronization has taken place, i.e. the difference E of the samples −1 and 1 has reached the preset target value, which is zero in this case.

Figure 5:
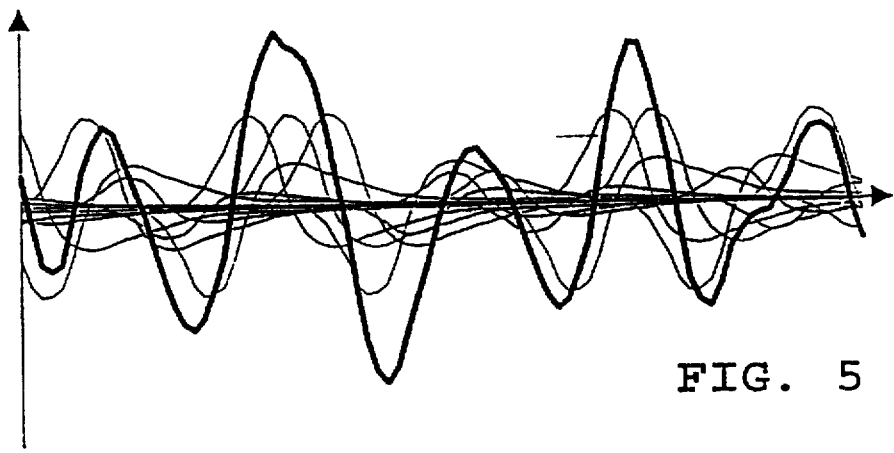

FIG. 5 shows a signal seen by the receiver when the method of the invention is applied, i.e. when several successive symbols are transmitted. The receiver does not thus see the pulse shape represented by the curve in FIG. 2 directly, due to the mutual interaction of the symbols, but it sees the signal represented by a thick line in FIG. 5. The thin lines in FIG. 5 represent the responses of single random symbols as set at intervals of a symbol duration. The thick line is the sum of the-thin lines. In the case of FIG. 5, the transmitter has used a four-level signal in which the symbol amplitudes are −3, −1, 1 and 3.

Figure 6:
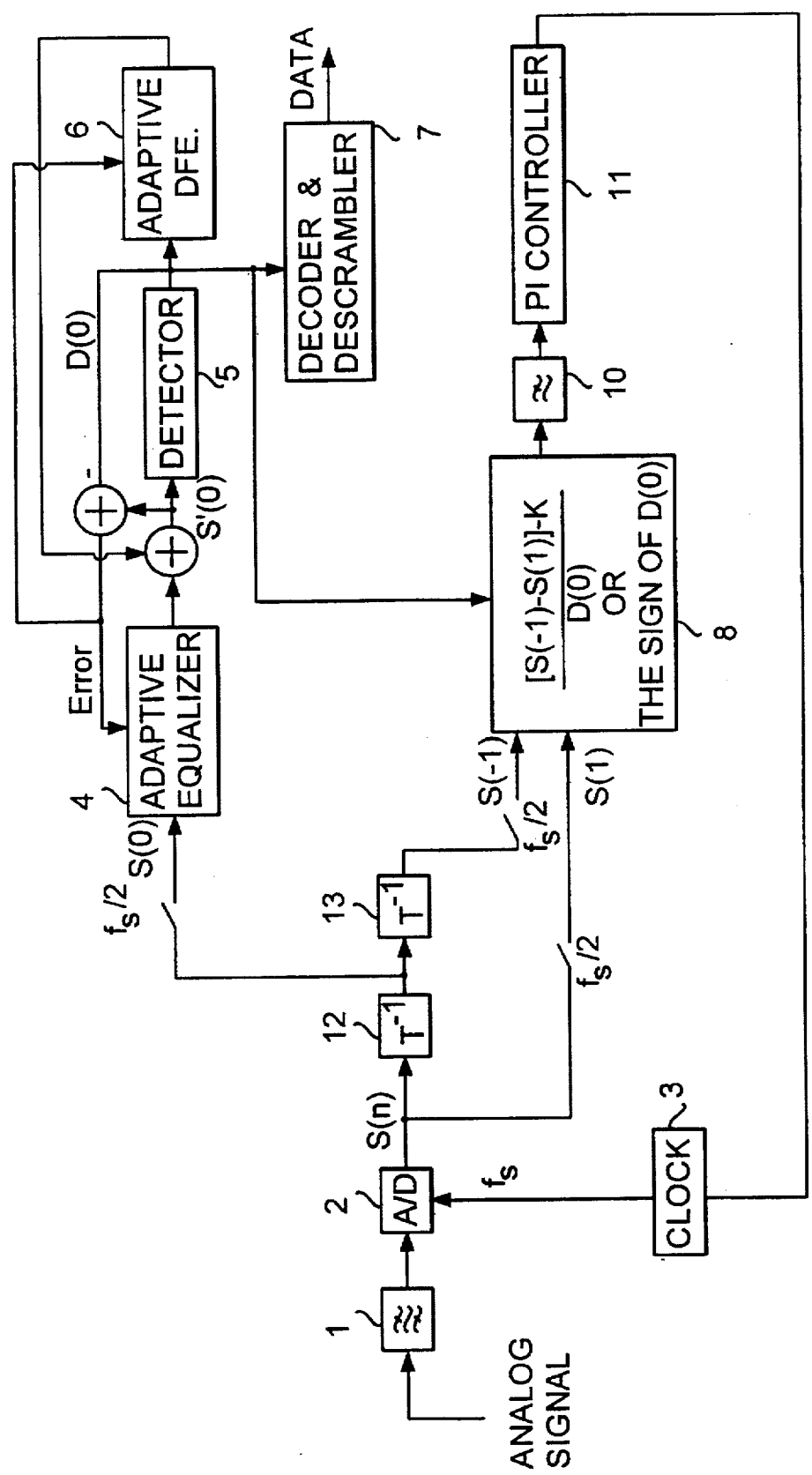

FIG. 6 shows a block diagram of the receiver of a baseband modem, it being possible to synchronize this receiver by means of the method of the invention. The receiver in FIG. 6 starts to synchronize with the frequency of the received signal immediately after an estimate of the pulse response has been obtained (in a manner known as such). The baseband analog signal applied by the transmitter is applied to the input of the band-pass filter 1 of the receiver. The band-pass filter 1 comprises a line transformer and analog filters. By means of the line transformer, it is possible to obtain a galvanic isolation from the line to the apparatus. The analog filters are used for removing the noise and other disturbances existing outside the transmission path and for carrying out a filtering intended to prevent an analog-to-digital converter 2 from folding.

The analog-to-digital converter 2 connected to the output of the filter 1 takes samples of the signal applied to it in synchronization with a clock 3. The samples are quantized into, for instance, a 16-bit format. 16-bit samples S(n) are applied from the output of the analog-to-digital converter 2 twice from a symbol. At the initial moment, the frequency of the clock 3 is with a certain accuracy (200 ppm) the same as the frequency of the symbol clock of the opposite transmitter (not shown in the figure) as multiplied by two (by N if N samples/symbol are taken). The cycles of the clock 3 can be momentarily adjusted by a PI controller 11.

Delay means 12 and 13 are connected successively to the output of the analog-to-digital converter 2, it being possible to produce a delay of the duration of half a symbol by D(0) OR means of these delay means. By means of the delay means, a decision sample S(0) and a first S(−1) and a second S(1) reference sample are selected from among the samples S(n) obtained from the output of the analog-to-digital converter.

The decision sample S(0) is applied via an adaptive equalizer 4 to a detector 5, by means of which the receiver recognizes the symbol applied to it. The adaptive equalizer 4 removes the distortion existing before the moment of decision-making from the pulse response. An FIR filter is preferably used as the adaptive equalizer, this filter being adjusted by the error of the equalized signal by an LMS algorithm. The equalizer is calculated once in a symbol. The decision D(0) obtained from the output of the detector 5 is applied to an adaptive DFE (Decision Feedback Equalizer) 6 to remove the tail of the pulse response following the moment of decision-making, and to a decoder and descrambler 7, by means of which the received symbols are converted to bits. The descrambler removes the added pseudo-randomness from the transmitted bit sequence. The decision D(0) obtained from the output of the detector is also used for synchronization, wherefore it is applied to a calculator 8.

To synchronize the sampling frequency of the analog-to-digital converter 2, the first reference sample S(−1) obtained from the output of the delay means 13 and the second reference sample S(1) obtained from the output of the analog-to-digital converter 2 are applied to the calculator 8. The calculator 8 calculates:

- a difference E=S(−1)−S(1) of the samples S(−1) and S(1) used for synchronization,
  the difference of the difference E and a target value K, after which the difference is divided by D(0) or the sign of D(0) to determine synchronization information SI.

The single synchronization information SI obtained from the output of the calculator 8 is applied to a low-pass filter 10 to remove the effect of momentary disturbances. The low-pass filter 10 is preferably a digital IIR filter.

The single synchronization information SI also contains symbol interaction. To remove the interaction, the synchronization information SI is applied from the low-pass filter 10 to the PI controller 11, which is used for summing (integrating) the synchronization information obtained from several different symbols.

In applying the method of the invention, the target value K is adjusted, preferably in such a manner that as the synchronization progresses, the value of K is changed gradually towards the optimum target value, which is preferably zero. It is thus possible to carry out the synchronization in several stages, roughly at first, after which the synchronization becomes more and more accurate as the target value K changes.

It should be noticed that the method of the invention can be applied also in contexts other than those involving modem synchronization even though the invention has been described above by way of example by means of modems. The preferred embodiments of the method of the invention can thus vary within the scope of the appended claims.

I claim:

1. A method for synchronizing a receiver with the frequency and phase of a received signal, said method comprising the steps of:

(a) taking samples of the received signal at predetermined intervals, at least two samples being taken during the duration of one received symbol;

(b) selecting a decision sample (S(0)) from the samples taken such that said decision sample is preceded by at least one preceding one of said samples and succeeded by at least one subsequent one of said samples;

(c) selecting a first reference sample (S(−1)) from the at least one said sample preceding the decision sample (s(0));

(d) selecting a second reference sample (S(1)) from the at least one said sample subsequent to the decision sample;

(e) calculating a difference (E) of the first (S(−1)) and second (S(1)) reference samples;

(f) comparing the difference with a target value (K);

(g) adjusting the sample-taking frequency used in step (a) on the basis of the comparison made in step (f);

in such a manner that the target value (K) by means of which the synchronization can be carried out roughly is used at first, after which the target value (K) is changed towards an optimum target value to fine-adjust the synchronization.

2. The method according to claim 1, wherein:

said adjusting modules adjusting said sample-taking frequency to reach said optimum target value (K).

3. The method according to claim 1 wherein:

for comparing the difference and the target value in step (f) calculating the difference of the difference (E) and the target value (K), and dividing the obtained result by one of the decision symbol recognized on the basis of the decision sample or the sign of the symbol recognized on the basis of the decision sample, in order to determine synchronization information (SI); and in step (g), adjusting the sample-taking frequency on the basis of said synchronization information (SI).

4. The method according to claim 3, characterized in that further comprising:

in order to remove an interaction, integrating said synchronization information (SI) before adjusting said sample-taking frequency in step (g).

5. The method according to claim 3 further comprising:

before adjusting said sample-taking frequency in step (g), low-pass filtering said synchronization information (SI) to minimize the effect of disturbances.

6. The method according to claim 1 wherein:

said receiver in respect to which steps (a)–(g) are conducted for providing synchronization, is a modem.

* * * * *